United States Patent [19]

Buono et al.

[11] 4,329,263

[45] May 11, 1982

[54] ACCELERATOR SYSTEMS FOR POLYESTER RESIN COMPOSITIONS

[75] Inventors: Frederick J. Buono, Robbinsville, N.J.; Samuel Hoch, Brooklyn, N.Y.

[73] Assignee: Tenneco Chemicals, Inc., Piscataway, N.J.

[21] Appl. No.: 211,548

[22] Filed: Dec. 1, 1980

[51] Int. Cl.³ .......................... C08L 67/06; C08F 4/34
[52] U.S. Cl. ...................................... 525/17; 106/310; 252/431 C; 525/27
[58] Field of Search ............................. 525/13, 17, 27; 260/22 CB, 22 CA; 106/310; 252/431 C

[56] References Cited

U.S. PATENT DOCUMENTS 3,962,189  6/1976  Russin et al. ................... 252/431 C
4,175,064  11/1979  Landau et al. ................. 260/22 CA

*Primary Examiner*—Wilbert J. Briggs, Sr.
*Attorney, Agent, or Firm*—Evelyn Berlow

[57] ABSTRACT

Accelerator systems that comprise cobalt salts of monocarboxylic acids having 6 to 12 carbon atoms and potassium salts of monocarboxylic acids having 1 to 5 carbon atoms are used to accelerate the curing of peroxide-catalyzed unsaturated polyester resin compositions.

14 Claims, No Drawings

ACCELERATOR SYSTEMS FOR POLYESTER RESIN COMPOSITIONS

This invention relates to unsaturated polyester resin compositions that are capable of rapid curing at low temperatures and to a process for the curing of unsaturated polyester resin compositions. More particularly, it relates to a process for accelerating the curing of peroxide-catalyzed unsaturated polyester resin compositions by the use of an accelerator system that comprises cobalt and potassium salts of organic acids. It further relates to a metal salt composition that is an effective accelerator for the peroxide curing of unsaturated polyester resin compositions.

The unsaturated polyester resin compositions to which this invention applies are solutions of unsaturated polyester resins in a polymerizable monomer which provides cross-linking units to unite the polymer chains. The polyester and monomer copolymerize upon the introduction of a peroxide catalyst to form a rigid, insoluble, infusible material. These unsaturated polyester resin compositions have found widespread use in the production of coatings, laminates, cast articles, molded articles, and other shaped articles.

Accelerators are usually added to unsaturated polyester resin compositions to accelerate the decomposition of the peroxide catalyst to free radicals and thereby initiate or speed the curing of the composition at relatively low temperatures, i.e., at temperatures in the range of 0° to 30° C. Among the materials that have been reported as being effective accelerators are metal compounds, such as cobalt, manganese, iron, vanadium, copper, and aluminum salts of organic acids; amines, such as dimethylaniline, diethylaniline, and 2-aminopyridine; Lewis acids, such as boron fluoride dihydrate and ferric chloride; bases, such as tetraethanol ammonium hydroxide and tetramethyl ammonium hydroxide; quaternary ammonium salts, such as trimethylbenzyl ammonium chloride and tetrakismethylol phosphonium chloride; and sulfur compounds, such as dodecyl mercaptan and 2-mercaptoethanol. Cobalt salts of organic acids are the most widely-used accelerators for the low temperature decomposition of peroxide catalysts and the curing of unsaturated polyester resin compositions.

The curing time of unsaturated polyester resin compositions at low temperatures can be further reduced by the use of a second accelerator in combination with the cobalt compounds. Among the co-accelerators that have been used in combination with a cobalt salt of an organic acid to promote the curing of unsaturated polyester resin compositions are amines, such as dimethylaniline, diethanolamine, tetramethylbutane diamine, and diethylene triamine, and samarium salts of organic acids. In U.S. Pat. No. 4,175,064, Landau et al disclosed accelerator systems for peroxide-catalyzed unsaturated polyester resin compositions that comprise solutions of cobalt salts and potassium salts of monocarboxylic acids having 6 to 24 carbon atoms in an organic solvent mixture that contains both polar and non-polar solvents. The use of these cobalt salt-potassium salt systems results in the rapid curing of unsaturated polyester resin compositions at low temperatures. Their use also provides shorter initial gel times and less gel time drift on aging than result when the same amount or a larger amount of the cobalt salt is used alone or in combination with another co-accelerator. Solutions of the cobalt and potassium salts of monocarboxylic acids having 6 to 24 carbon atoms that contain 8% or more total metal, however, are viscous liquids that are often difficult to handle and to incorporate into the unsaturated polyester resin compositions. In addition, these salt solutions are relatively costly to manufacture and use.

It has now been found that accelerator systems that comprise cobalt salts of monocarboxylic acids having 6 to 12 carbon atoms and potassium salts of monocarboxylic acids having 1 to 5 carbon atoms are very effective curing agents for unsaturated polyester resin compositions at low temperatures. Their use provides initial gel times and gel time drift on aging that are equivalent to or better than those provided by systems that contain cobalt salts and potassium salts of monocarboxylic acids having 6 to 24 carbon atoms. The novel accelerator systems do not have the aforementioned disadvantages of the accelerator systems disclosed by Landau et al. These systems, which may have total metal contents of up to about 15% by weight, are relatively inexpensive, nonviscous liquids that are easily handled and incorporated into unsaturated polyester resin compositions.

The cobalt salt component of the accelerator systems of this invention is derived from monocarboxylic acids that have 6 to 12 carbon atoms. The useful acids include saturated and unsaturated aliphatic, aromatic, and alicyclic monocarboxylic acids, such as hexanoic acid, heptanoic acid, n-octanoic acid, 2-ethylhexanoic (octoic) acid, nonanoic acid, isononanoic acid, n-decanoic acid, isodecanoic acid, neodecanoic acid, n-dodecanoic acid, neododecanoic acid, decenoic acid, undecylenic acid, benzoic acid, p-tert.butylbenzoic acid, salicylic acid, monobutyl maleate, monobutyl phthalate, cyclohexanoic acid, cycloheptanoic acid, methylcyclohexanoic acid, and mixtures thereof.

The potassium salt component of the accelerator systems is derived from monocarboxylic acids having 1 to 5 carbon atoms, that is, formic acid, acetic acid, propionic acid, butyric acid, valeric acid, and mixtures thereof.

The accelerator systems preferably comprise cobalt salts of aliphatic monocarboxylic acids having 8 to 12 carbon atoms and potassium acetate.

The cobalt and potassium salts are added to the unsaturated polyester resin compositions as solutions in organic solvents. Solutions of the cobalt and potassium salts may be added separately, or a solution that contains both cobalt and potassium salts may be added to the unsaturated polyester resin composition.

In a preferred embodiment of the invention, the accelerator systems are solutions of cobalt and potassium salts in a solvent in which both salts are soluble. Suitable solvents include mixtures that contain from 20% to 80% preferably 40% to 60% by weight of one or more polar solvents and 20% to 80% preferably 40% to 60% by weight of one or more non-polar solvents. The solvent mixtures preferably contain an alkanol having 3 to 20 carbon atoms, such as propanol, butanol, hexanol, n-octanol, 2-ethylhexanol, n-decanol, isodecanol, 2-ethyloctanol, dodecanol, tridecanol, or tetradecanol; a hydrocarbon having 5 to 20 carbon atoms, such as pentane, hexane, octane, decane, and mineral spirits; and optionally minor amounts of water, monocarboxylic acids, glycols, such as ethylene glycol and propylene glycol, and/or glycol ethers, such as diethylene glycol, dipropylene glycol, polypropylene glycol, and monobutyl ether of diethylene glycol.

These accelerator systems can be prepared by mixing together amounts of solutions of the cobalt and potassium salts in organic solvents that will form a solution that contains from 3% to 6% by weight of cobalt (as the metal) and from 5% to 10% by weight of potassium (as the metal) and that has a total metal content of from 8% to 15% by weight. The cobalt salt is usually added as a cobalt salt solution that contains 4% to 20% by weight of cobalt, and the potassium salt is usually added as a potassium salt solution that contains 5% to 24% by weight of potassium. The accelerator systems preferably contain from 3.75% to 4.5% by weight of cobalt and from 6.25% to 8% by weight of potassium and have a total metal content of from 10% to 12% by weight.

Alternatively, the accelerator systems can be formed by dissolving the metal salts separately in an appropriate organic solvent or by dissolving a salt of one of the metals in a solution in an organic solvent of a salt of the other metal in amounts that will form systems that contain from 3% to 6% by weight of cobalt and 5% to 10% by weight of potassium and have a total metal content of from 8% to 15% by weight.

The amounts of the accelerator systems that are used to accelerate the curing of unsaturated polyester resin compositions are those that will provide from 0.001% to 0.1% of cobalt (as the metal) and from 0.001% to 0.1% of potassium (as the metal) and preferably from 0.01% to 0.05% of cobalt and from 0.01% to 0.05% of potassium, based on the weight of the unsaturated polyester resin composition. In most cases, from 0.1% to 3% by weight and preferably 0.25% to 2% by weight of the accelerator system will provide these amounts of cobalt and potassium.

Analysis of the metal salt solutions of this invention has shown that in solution two moles of the potassium salt combines with one mole of the cobalt salt to form cobalt complexes whose structure is not now known. The excellent activity of the accelerator systems of this invention probably arises from the presence in them of these cobalt salt/potassium salt complexes.

In addition to the cobalt salt/potassium salt complexes, the accelerator systems may contain cobalt salts and/or potassium salts of the aforementioned monocarboxylic acids.

The polyester resins that are used in the practice of this invention are unsaturated polyester resins that are formed by condensing a saturated dicarboxylic acid or anhydride and an unsaturated dicarboxylic acid or anhydride with a dihydric alcohol. Illustrative of these polyester resins are the products of the reaction of a saturated dicarboxylic acid or anhydride, such as phthalic anhydride, isophthalic acid, tetrahydrophthalic anhydride, hexahydrophthalic anhydride, endomethylene tetrahydrophthalic anhydride, tetrachlorophthalic anhydride, hexachloroendomethylene tetrahydrophthalic acid, succinic acid, glutaric acid, adipic acid, pimelic acid, suberic acid, azelaic acid, and sebacic acid, and an unsaturated dicarboxylic acid or anhydride, such as maleic anhydride, fumaric acid, chloromaleic acid, itaconic acid, citraconic acid, and mesaconic acid, with a dihydric alcohol, such as ethylene glycol, propylene glycol, butylene glycol, diethylene glycol, triethylene glycol, and neopentyl glycol. Small amounts of a polyhydric alcohol, such as glycerol, pentaerythritol, trimethylolpropane, or sorbitol, may be used in combination with the glycol.

A three-dimensional structure is produced by reacting the unsaturated polyester through the unsaturated acid component with an unsaturated monomer that is capable of reacting with the polyester resin to form cross-linkages. Suitable unsaturated monomers include styrene, methylstyrene, dimethylstyrene, vinyltoluene, divinylbenzene, dichlorostyrene, methyl acrylate, ethyl acrylate, methyl methacrylate, diallyl phthalate, vinyl acetate, triallyl cyanurate, acrylonitrile, acrylamide, and mixtures thereof. The relative amounts of the unsaturated polyester resin and the unsaturated monomer in the composition may be varied over a wide range.

The unsaturated polyester resin compositions generally contain 20% to 80% by weight of the monomer, with the monomer content preferably in the range of 30% to 70% by weight.

An organic peroxide that decomposes to release free radicals at temperatures in the range of 0° to 30° C. is used to catalyze the copolymerization reaction between the unsaturated polyester resin and the unsaturated monomer. Among the peroxide catalysts that can be used are methyl ethyl ketone peroxide, benzoyl peroxide, cumene hydroperoxide, cetyl peroxide, lauroyl peroxide, cyclohexanone peroxide, 2,4-dichlorobenzoyl peroxide, bis(p-bromobenzoyl)peroxide, acetyl peroxide, and di-tert.butyl diperphthalate. The peroxide catalysts that are most commonly used are methyl ethyl ketone peroxide, benzoyl peroxide, and cumene hydroperoxide. The amount of peroxide catalyst used is from 0.1% to 1.1% and preferably from 0.6% to 1.0% of the weight of the unsaturated polyester resin composition.

In addition to the unsaturated polyester resin, cross-linking monomer, peroxide catalyst, and one of the accelerator systems of this invention, the unsaturated polyester resin compositions may also contain an inhibitor, such as tert.butylcatechol or hydroquinone, fillers and pigments, dyes, mold release agents, plasticizers, stabilizers, flame-retardants, and other additives in the amounts ordinarily used for these purposes.

The unsaturated polyester resin compositions that comprise an unsaturated polyester resin, an unsaturaged monomer, a peroxide catalyst, and an accelerator system of this invention cure rapidly without application of heat to form rigid, insoluble, and infusible products.

The invention is further illustrated by the following examples. In these examples, all parts are parts by weight and all percentages are percentages by weight.

EXAMPLE 1

Accelerator systems were prepared by mixing together a solution of cobalt octoate in mineral spirits (6% Co) and a solution of potassium acetate in a mixture of isodecanol, water, and butyl cellosolve (12% K) in amounts that provided two moles of potassium per mole of cobalt and formed products having total metal contents of either 10% or 12%.

For comparative purposes, accelerator systems were prepared by mixing together a solution of cobalt octoate in mineral spirits and a solution of potassium octoate in isodecanol in amounts that provided two moles of potassium per mole of cobalt and formed products having total metal contents of either 8%, 10%, or 12%. The metal contents and viscosities of the accelerator systems are shown in Table I.

TABLE I

Viscosities of Cobalt-Potassium Accelerator Systems

| Ex. No. | Accelerator System | Metal Content (% by weight) | | | Gardner-Holdt Viscosity at 25° C. |
|---|---|---|---|---|---|
| | | Co | K | Total | |
| 1-1 | Co Octoate K Acetate | 3.75 | 6.25 | 10 | A+ |
| 1-2 | Co Octoate K Acetate | 4.5 | 7.5 | 12 | D-E |
| Comp. Ex. | | | | | |
| A | Co Octoate K Octoate | 3 | 5 | 8 | Q |
| B | Co Octoate K Octoate | 3.75 | 6.25 | 10 | V |
| C | Co Octoate K Octoate | 4.5 | 7.5 | 12 | Z5-Z6 (gelled) |

From the data in Table I, it will be seen that the cobalt octoate-potassium octoate systems of the comparative examples were substantially more viscous than the cobalt octoate-potassium acetate systems having the same total metal content and that the cobalt octoate-potassium octoate system that had a total metal content of 8% was far more viscous than the cobalt octoate-potassium acetate system that had a total metal content of 12%.

EXAMPLE 2

Unsaturated polyester resin compositions were prepared by the following procedure:

Portions of a styrenated polyester resin (Stypol 40-0811, Freeman Chemical Corp.) were mixed with an amount of an accelerator system that provided 0.02% of metal, based on the weight of the composition.

Fifty gram portions of the styrenated polyester resin-accelerator system mixtures in four ounce jars were placed in a constant temperature bath at 27° C. To each portion was added 0.45 cc of a 60% solution of methyl ethyl ketone peroxide in dimethyl phthalate. The time required for the unsaturated polyester resin to gel was measured using a Mol-Rez Gel Time Meter.

The gelation test was repeated after the styrenated polyester resin-accelerator system mixtures had aged for periods ranging from 1 to 4 weeks.

The accelerator systems used and the results obtained are summarized in Table II.

TABLE II

| | Ex. 2 | Comp. Ex. D | Comp. Ex. E |
|---|---|---|---|
| Accelerator System Used | Co Octoate K Acetate (Ex. 1-2) | Co Octoate K Octoate (Comp. Ex. A) | K Octoate |
| Total Metal Content of Accelerator System | 12% | 8% | 10% |
| Amount of Metal Added (% based on weight of composition) | 0.02 | 0.02 | 0.02 |
| Gelation Time (Minutes) | | | |
| Initial | 10 | 9.5 | >60 |
| After 1 Week | 10.5 | 10 | >60 |
| After 2 Weeks | 10 | 8 | >60 |
| After 3 Weeks | 11.5 | 11.5 | >60 |
| After 4 Weeks | 9.5 | 8 | >60 |

The results in Table II show that the accelerator system of this invention provided an initial gel time equivalent to that provided by the comparative system that contained cobalt octoate and potassium octoate and somewhat less gel time drift on aging. They also show that an accelerator system having a higher total metal content (12% vs. 8%) can be used to accelerate the curing of an unsaturated polyester resin composition when the potassium salt component is potassium acetate than when it is potassium octoate.

Each of the other potassium salts disclosed herein can also be used in combination with cobalt salts of monocarboxylic acids having 6 to 12 carbon atoms to form low cost, low viscosity accelerator systems for unsaturated polyester resin compositions.

What is claimed is:

1. In the process for the curing of an unsaturated polyester resin composition that comprises contacting a composition comprising an unsaturated polyester resin and an unsaturated monomer capable of reacting with said unsaturated polyester resin to form cross-linkages with an organic peroxide catalyst and an accelerator system that comprises cobalt and potassium salts of monocarboxylic acids, the improvement wherein the accelerator system comprises at least one cobalt salt of a monocarboxylic acid having 6 to 12 carbon atoms and at least one potassium salt of a monocarboxylic acid having 1 to 5 carbon atoms, said system being present in an amount that will provide from 0.001% to 0.1% of cobalt and 0.001% to 0.1% of potassium, based on the weight of the unsaturated polyester resin.

2. The process of claim 1 wherein the accelerator system is a solution of said cobalt and potassium salts that contains from about 3% to 6% by weight of cobalt (as metal) and from about 5% to 10% by weight of potassium (as metal) and that has a total metal content of from 8% to 15% by weight.

3. The process of claim 1 wherein the accelerator system is a solution of said cobalt and potassium salts that contains from 3.75% to 4.5% by weight of cobalt (as metal) and from 6.25% to 8% by weight of potassium (as metal) and that has a total metal content of from 10% to 12% by weight.

4. The process of claim 1 wherein the accelerator system is a solution of said cobalt and potassium salts in an organic solvent mixture that contains from 20% to 80% by weight of at least one polar solvent and from 20% to 80% by weight of at least one non-polar solvent.

5. The process of claim 1 wherein the accelerator system is a solution of cobalt octoate and potassium acetate in an organic solvent mixture that contains from 40% to 60% by weight of at least one polar solvent and from 40% to 60% by weight of at least one non-polar solvent.

6. The process of claim 1 wherein a solution of said cobalt salt in an organic solvent and a solution of said potassium salt in an organic solvent are added separately to the unsaturated polyester resin composition.

7. An unsaturated polyester resin composition that comprises
 (a) an unsaturated polyester resin;
 (b) an unsaturated monomer capable of reacting with the unsaturated polyester resin to form cross-linkages;
 (c) an organic peroxide catalyst; and
 (d) an accelerator system that comprises at least one cobalt salt of a monocarboxylic acid having 6 to 12 carbon atoms and at least one potassium salt of a monocarboxylic acid having 1 to 5 carbon atoms, said accelerator system being present in an amount that will provide from 0.001% to 0.1% of cobalt (as metal)

and from 0.001% to 0.1% of potassium (as metal), based on the total weight of the unsaturated polyester resin and the unsaturated monomer.

8. An unsaturated polyester resin composition as defined in claim 7 wherein the accelerator system comprises cobalt octoate and potassium acetate.

9. An unsaturated polyester resin as defined in claim 7 wherein the accelerator system is present in an amount that will provide from 0.01% to 0.05% of cobalt (as metal) and from 0.01% to 0.05% of potassium (as metal), based on the total weight of the unsaturated polyester resin and the unsaturated monomer.

10. An accelerator system for peroxide-catalyzed unsaturated polyester resin compositions that is a solution of a metal compound selected from the group consisting of a mixture of cobalt salts of monocarboxylic acids having 6 to 12 carbon atoms and potassium salts of monocarboxylic acids having 1 to 5 carbon atoms, reaction products of said cobalt and potassium salts, and mixtures thereof in an organic solvent that contains from 20% to 80% by weight of at least one polar solvent and from 20% to 80% by weight of at least one non-polar solvent, said solution containing from 3% to 6% by weight of cobalt (as metal) and from 5% to 10% by weight of potassium (as metal) and having a total metal content of from 8% to 15% by weight.

11. An accelerator system as defined in claim 10 that contains from 3.75% to 4.5% by weight of cobalt (as metal) and from 6.25% to 8% by weight of potassium (as metal) and that has a total metal content of from 10% to 12% by weight.

12. An accelerator system as defined in claim 10 that is a solution of cobalt octoate and potassium acetate in an organic solvent mixture that contains from 40% to 60% by weight of at least one polar solvent and from 40% to 60% by weight of at least one non-polar solvent.

13. The cobalt complex that is the product of the reaction of one mole of a cobalt salt of a monocarboxylic acid having 6 to 12 carbon atoms with two moles of a potassium salt of a monocarboxylic acid having 1 to 5 carbon atoms in an organic solvent mixture containing 20% to 80% of polar solvent and 20% to 80% of non-polar solvent.

14. The cobalt complex as defined in claim 13 that is the product of the reaction of one mole of cobalt octoate with two moles of potassium acetate.

* * * * *